(12) United States Patent
Kim et al.

(10) Patent No.: US 10,407,949 B2
(45) Date of Patent: Sep. 10, 2019

(54) TRAY DEVICE FOR VEHICLE

(71) Applicants: Hyundai Motor Company, Seoul (KR); KOREA HITEK CO., LTD, Ansan-si (KR); LS Automotive Technologies Co., Ltd., Anyang-si (KR); Ecoplastic Corporation, Gyeongju-si (KR)

(72) Inventors: Hye Kyung Kim, Suwon-si (KR); Gye Young Ahn, Seoul (KR); Sang Min Lee, Suwon-si (KR); Young Ju Lee, Suwon-si (KR); Dae Ig Jung, Suwon-si (KR); Keon Soo Jin, Ulsan (KR); Hyo Kyoung Jeon, Daegu (KR); Chul Ho Chun, Gyeongju-si (KR); Won Lee, Anyang-si (KR); Moon Soo Kim, Ansan-si (KR)

(73) Assignees: Hyundai Motor Company, Seoul (KR); KOREA HITEK CO., LTD, Ansan-si (KR); LS Automotive Technologies Co., Ltd., Anyang-si (KR); Ecoplastic Corporation, Gyeongju-si (KR)

( * ) Notice: Subject to any disclaimer, the term of this patent is extended or adjusted under 35 U.S.C. 154(b) by 362 days.

(21) Appl. No.: 15/355,566

(22) Filed: Nov. 18, 2016

(65) Prior Publication Data

US 2018/0016823 A1 Jan. 18, 2018

(30) Foreign Application Priority Data

Jul. 14, 2016 (KR) .................. 10-2016-0089459

(51) Int. Cl.
*E05B 83/28* (2014.01)
*B60N 3/00* (2006.01)
(Continued)

(52) U.S. Cl.
CPC .............. *E05B 83/28* (2013.01); *B60N 3/002* (2013.01); *B60R 7/043* (2013.01); *E05B 17/226* (2013.01);
(Continued)

(58) Field of Classification Search
CPC .......... E05B 83/28; E05B 83/30; E05B 83/32; E05B 17/226; E05B 81/08; E05B 81/16;
(Continued)

(56) References Cited

U.S. PATENT DOCUMENTS 4,570,466 A * 2/1986 Matthews ........... E05B 47/0002 292/150
4,642,631 A * 2/1987 Rak .................... G07C 9/00142 340/5.26

(Continued)

FOREIGN PATENT DOCUMENTS

JP 7-290952 A 11/1995
KR 10-1242404 B 10/1998
(Continued)

*Primary Examiner* — Hilary L Gutman
(74) *Attorney, Agent, or Firm* — Morgan, Lewis & Bockius LLP

(57) ABSTRACT

A tray device for a vehicle may include a tray provided in the vehicle and having a cover configured for being opened, a locking module provided in the cover to lock or unlock the cover, and a touch pad provided on an outer side of the cover and interworking with the locking module to unlock the cover through a touch operation.

11 Claims, 11 Drawing Sheets

(51) Int. Cl.
*B60R 7/04* (2006.01)
*E05B 17/22* (2006.01)
*E05B 81/16* (2014.01)
*E05B 81/90* (2014.01)
*E05C 7/04* (2006.01)
*E05C 9/04* (2006.01)
*G07C 9/00* (2006.01)
*E05B 81/08* (2014.01)
*E05B 47/00* (2006.01)

(52) U.S. Cl.
CPC ............ *E05B 81/08* (2013.01); *E05B 81/16* (2013.01); *E05B 81/90* (2013.01); *E05C 7/04* (2013.01); *E05C 9/041* (2013.01); *G07C 9/00182* (2013.01); *E05B 2047/0084* (2013.01); *G07C 2009/00769* (2013.01)

(58) Field of Classification Search
CPC . E05B 81/90; E05B 2047/0084; B60N 3/002; B60R 7/043; G07C 9/00182; G07C 2009/00769
See application file for complete search history.

(56) References Cited

U.S. PATENT DOCUMENTS

| | | | | |
|---|---|---|---|---|
| 4,896,520 A * | 1/1990 | Bruhnke | ............... | E05B 13/005 70/159 |
| 4,897,644 A * | 1/1990 | Hirano | ................. | B60R 25/246 180/287 |
| 4,898,010 A * | 2/1990 | Futami | ................... | B60R 25/23 70/257 |
| 5,619,190 A | 4/1997 | Duckworth et al. | | |
| 5,627,529 A | 5/1997 | Duckworth et al. | | |
| 5,646,701 A | 7/1997 | Duckworth et al. | | |
| 6,164,219 A * | 12/2000 | Green | ................ | E05B 65/0075 109/73 |
| 7,931,313 B2 * | 4/2011 | Carabalona | ............... | E05C 3/16 292/251.5 |
| 8,191,935 B2 * | 6/2012 | Toppani | ................... | B60R 7/06 292/32 |
| 9,004,550 B2 * | 4/2015 | Carabalona | ............. | E05B 77/06 292/251.5 |
| 9,045,089 B1 * | 6/2015 | Bisson | ...................... | B60R 7/06 |
| 2002/0084666 A1 * | 7/2002 | Toppani | .................... | B60R 7/06 296/37.12 |
| 2005/0023901 A1 * | 2/2005 | Ghabra | ................... | B60R 25/04 307/10.5 |
| 2005/0104380 A1 * | 5/2005 | Cho | ....................... | E05B 83/30 292/33 |
| 2008/0196637 A1 * | 8/2008 | Howell | ................... | E05G 1/005 109/38 |
| 2008/0290682 A1 * | 11/2008 | Sauer | ......................... | B60R 7/06 296/37.12 |
| 2009/0038352 A1 * | 2/2009 | Yamaguchi | ............... | B60R 7/06 70/237 |
| 2009/0230699 A1 * | 9/2009 | Carabalona | ............... | B60R 7/06 292/48 |
| 2010/0071424 A1 * | 3/2010 | Tsuruta | ................. | E05B 63/248 70/91 |
| 2010/0235026 A1 * | 9/2010 | Shimizu | ................ | B60R 25/241 701/22 |
| 2015/0234186 A1 * | 8/2015 | Meadows | ............ | G02B 27/017 345/8 |
| 2017/0046898 A1 * | 2/2017 | Cabouli | ................ | G07C 9/00563 |
| 2018/0230720 A1 * | 8/2018 | Liu | ............................. | E05B 83/28 |
| 2018/0370488 A1 * | 12/2018 | Schoula | ................ | B60R 25/241 |
| 2018/0371795 A1 * | 12/2018 | Nakasone | ........... | E05B 47/0012 |
| 2019/0003215 A1 * | 1/2019 | Stoia | ....................... | E05B 83/30 |
| 2019/0040663 A1 * | 2/2019 | Ruzich | ...................... | E05C 9/04 |
| 2019/0063119 A1 * | 2/2019 | Sic | ............................. | B60R 7/06 |

FOREIGN PATENT DOCUMENTS

| | | | |
|---|---|---|---|
| KR | 10-2005-0021213 A | | 3/2005 |
| KR | 10-2005-0091903 A | | 9/2005 |
| KR | 20-2000-0002739 U | | 10/2005 |
| KR | 10-2006-0036981 A | | 5/2006 |
| KR | 10-2008-0000070 A | | 1/2008 |
| KR | 10-2009-0007943 A | | 1/2009 |
| KR | 10-0886772 B1 | | 3/2009 |
| KR | 10-2012-0105946 A | | 9/2012 |
| KR | 10-1559259 B1 | | 10/2015 |

* cited by examiner

TRAY DEVICE FOR VEHICLE

CROSS-REFERENCE TO RELATED APPLICATION

The present application claims priority to Korean Patent Application No. 10-2016-0089459, filed Jul. 14, 2016, the entire contents of which is incorporated herein for all purposes by this reference.

BACKGROUND OF THE INVENTION

Field of the Invention

The present invention relates to a tray device for a vehicle, and more particularly, to a tray device for a vehicle, having a function of locking or unlocking a tray provided within a vehicle to enhance security and user convenience.

Description of Related Art

In general, a tray for a vehicle, a convenience device provided in a vehicle, is a storage space for keeping an occupant's possessions or valuables.

In a tray, a cover is installed in an opening such that it is opened and closed, and an open button connected to the tray is provided on a front side of the cover so the cover may be opened by operating conventional art tray for a vehicle does not have a separate locking device, and thus is susceptible to burglary, so a technique of adding a locking device using a key to a tray to prevent theft has been introduced but carries the additional problem of degrading user convenience because locking and unlocking operations are not performed until a driver puts a key to the tray.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a tray device for a vehicle, having a function of locking or unlocking a tray provided within a vehicle to enhance security and user convenience.

According to various aspects of the present invention, a tray device for a vehicle may include a tray provided in the vehicle and having a cover capable of being opened, a locking module provided in the cover to lock or unlock the cover, and a touch pad provided on an outer side of the cover and interworking with the locking module to unlock the cover through a touch operation.

An unlocking module may be provided on an outer side of the tray and interworks with the locking module to forcibly open the cover.

The unlocking module may open the cover through an operation of a key.

The key may interwork with a smart key or a card key for the vehicle.

The touch operation of the touch pad may include touching at least one of a card and a password.

The card may interwork with a smart key or a card key for the vehicle.

The cover may include an upper cover and a lower cover, and the touch pad may be provided in either the upper cover or the lower cover.

A radio frequency (RF) receiver interworking with the card may be provided in the touch pad, and may have an infrared sensor.

A password registration button interworking with the touch pad may be provided in the locking module.

The locking module may be provided in each of the upper cover and the lower cover to simultaneously open the upper cover and the lower cover when unlocking the touch pad.

The locking module may include a first rod movably disposed in a horizontal direction and having a first end inserted into a first end of an inner side of the tray, a second rod movably disposed in the horizontal direction and having a first end inserted into a second end of the inner side of the tray, a first gear rotatably disposed at a second end of the first rod, a second gear rotatably disposed at a second end of the second rod, a coupling bar having gear teeth provided on both ends thereof and respectively coupled to the first gear and the second gear, and moved in a vertical direction according to rotations of the first gear and the second gear to move the first rod and the second rod, a connection rod positioned in at least one of the first rod and the second rod to move either of the first rod and the second rod, and an actuator connected to the connection rod and interworking with the touch pad to move the connection rod during an unlocking operation.

The touch pad and the actuator may be configured to interwork with a power source of the vehicle so as to be operated.

The unlocking module may include a rotor adapted for a key to be inserted thereinto, being rotatable, and having an arrest protrusion protruding from an end thereof, and a locking rod having a first end positioned to be adjacent to the arrest protrusion of the rotor and a second end positioned at at least one of the ends of the first rod and the second rod of the locking module, and moving at least one of the first rod and the second rod toward the inner side of the tray when the rotor rotates.

According to various aspects of the present invention, a tray device for a vehicle may include a tray provided in a vehicle and having an openable cover, a locking module provided in the cover to lock or unlock the cover, a touch pad provided on an outer side of the cover and interworking with the locking module to unlock the cover through a touch operation, and an unlocking module provided on an outer side of the tray and interworking with the locking module to forcibly open the cover through an operation of a key.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
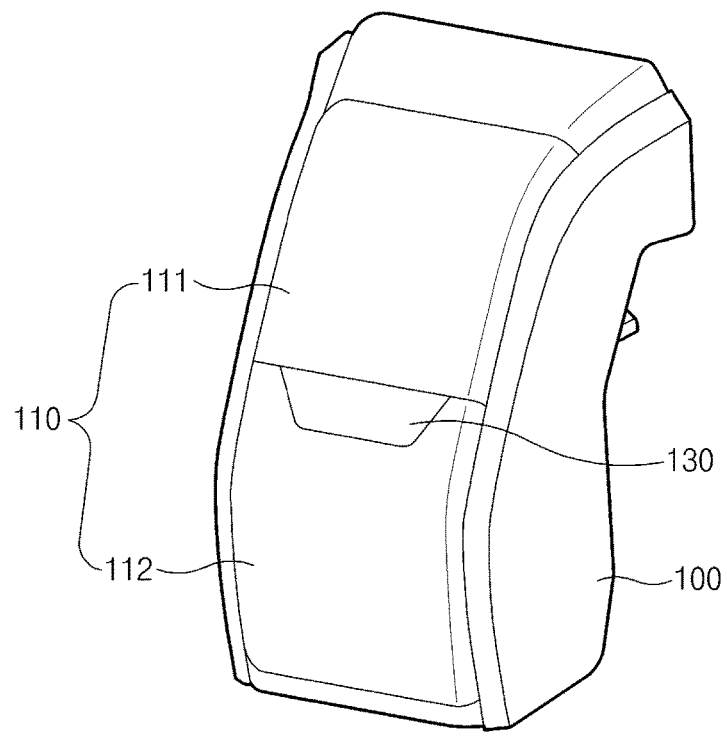
FIG. 1 is a view illustrating a tray device for a vehicle according to various embodiments of the present invention.
Figure 2:
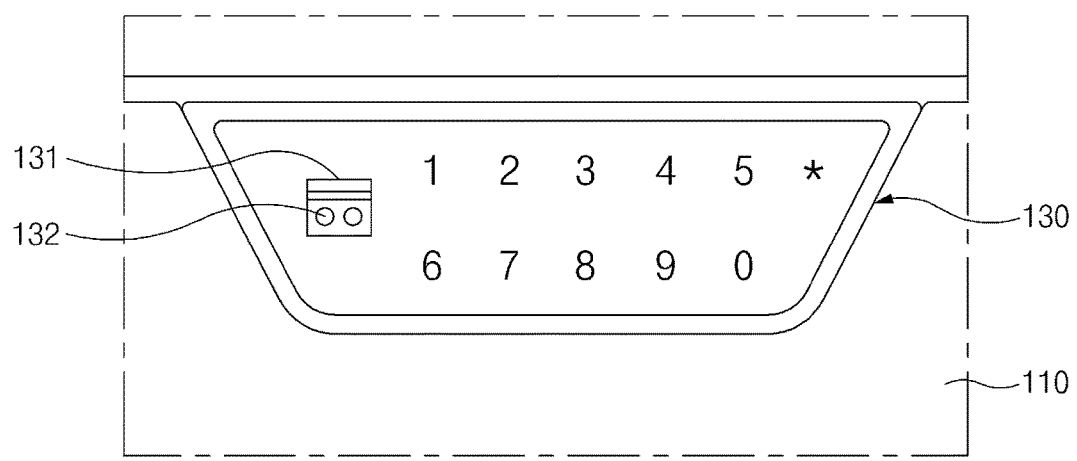
FIG. 2 is a view illustrating a touch pad of the tray device for a vehicle according to various embodiments of the present invention.
Figure 3:
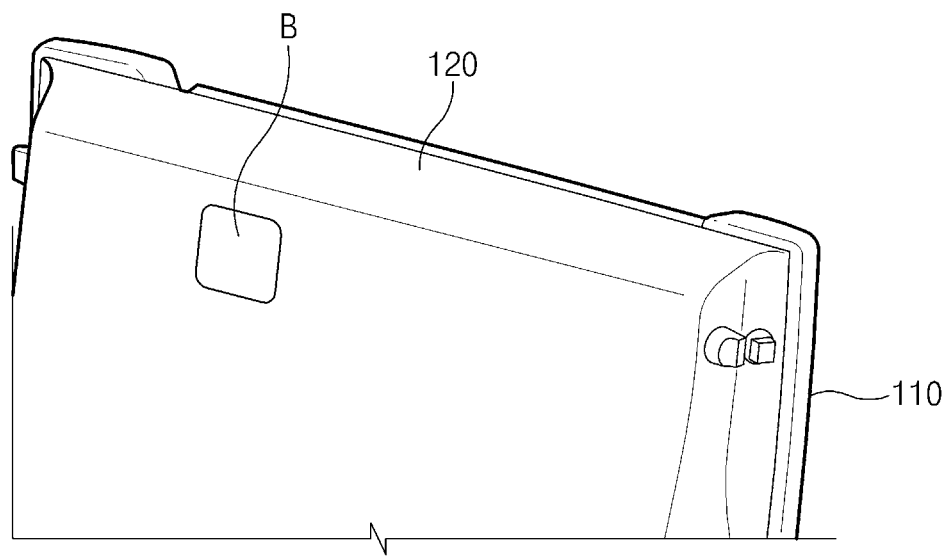
FIG. 3 is a view illustrating a locking module of the tray device for a vehicle according to various embodiments of the present invention.

As illustrated in FIGS. 1 to 3, a tray device for a vehicle according to various embodiments of the present invention includes a tray 100 with a cover 110, a locking module provided in the cover 110, and a touch pad 130 provided in the cover 110 and interworking with the locking module.

The tray 100, which is a storage space provided in a rear seat of a vehicle, has a housing shape and has the cover 110 provided on a front side and opened and closed.

The locking module 120 is provided on an inner side of the cover 110 to lock or unlock the cover 110.

The touch pad 130 is provided on an outer side of the cover 110 to allow a touch operation, and interworks with the locking module 120 to unlock the cover 110 through a touch operation.

Figure 7:
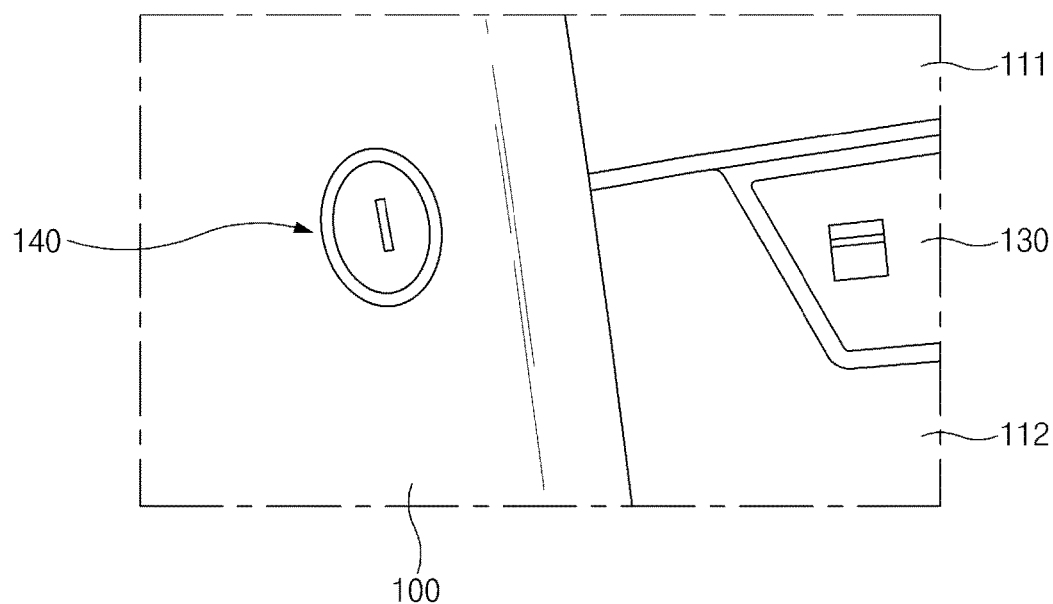
FIG. 7 is a view illustrating an unlocking module in the tray device for a vehicle according to various embodiments of the present invention.
Figure 8:
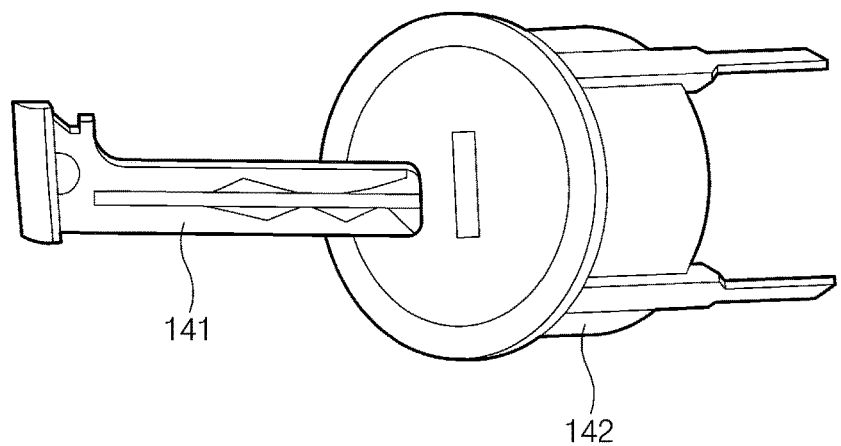
FIG. 8 is a view illustrating a state in which a key is inserted into the unlocking module in the tray device for a vehicle according to various embodiments of the present invention.

As illustrated in FIGS. 7 and 8, an unlocking module 140 is provided on an outer side of the tray 100 and interworks with the locking module 120 to forcibly open the cover 110. When the touch pad 130 is broken down, the cover 110 may be opened through the unlocking module 140.

The unlocking module 140 may open the cover 110 through an operation of a key 141.

Figure 12:
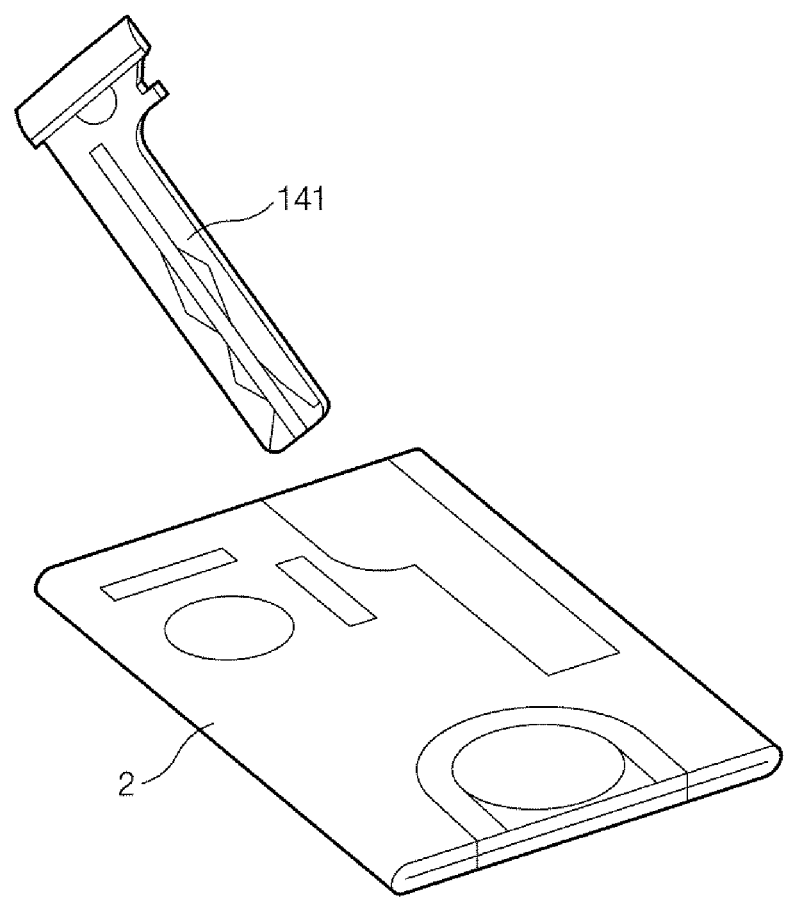
FIG. 12 is a view illustrating a key applied to a card key in the tray device for a vehicle according to various embodiments of the present invention.
Figure 13:
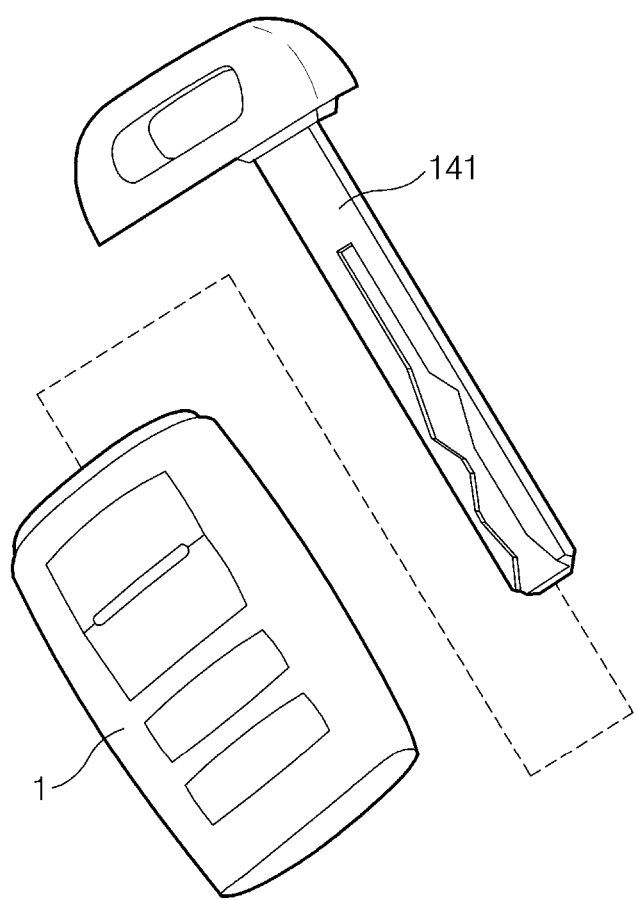
FIG. 13 is a view illustrating a key applied to a smart key in the tray device for a vehicle according to various embodiments of the present invention.

As illustrated in FIGS. 12 and 13, the key 141 may interwork with a smart key 1 or a card key 2 for a vehicle such that someone else other than a driver holding the smart key 1 or the card key 2 may not forcibly open the cover 110.

A touch operation of the touch pad 130 includes touching a card or touching a password.

Here, touching a password refers to inputting a previously registered password to the touch pad 130, and touching a card refers to bringing a card into contact with the touch pad 130 to open the cover 110 when is it inconvenient to input a password.

Here, the card may interwork with the smart key 1 or the card key 2 for a vehicle so that someone else other than the driver holding the smart key 1 or the card key 2 may not forcibly open the cover 110.

Figure 4:
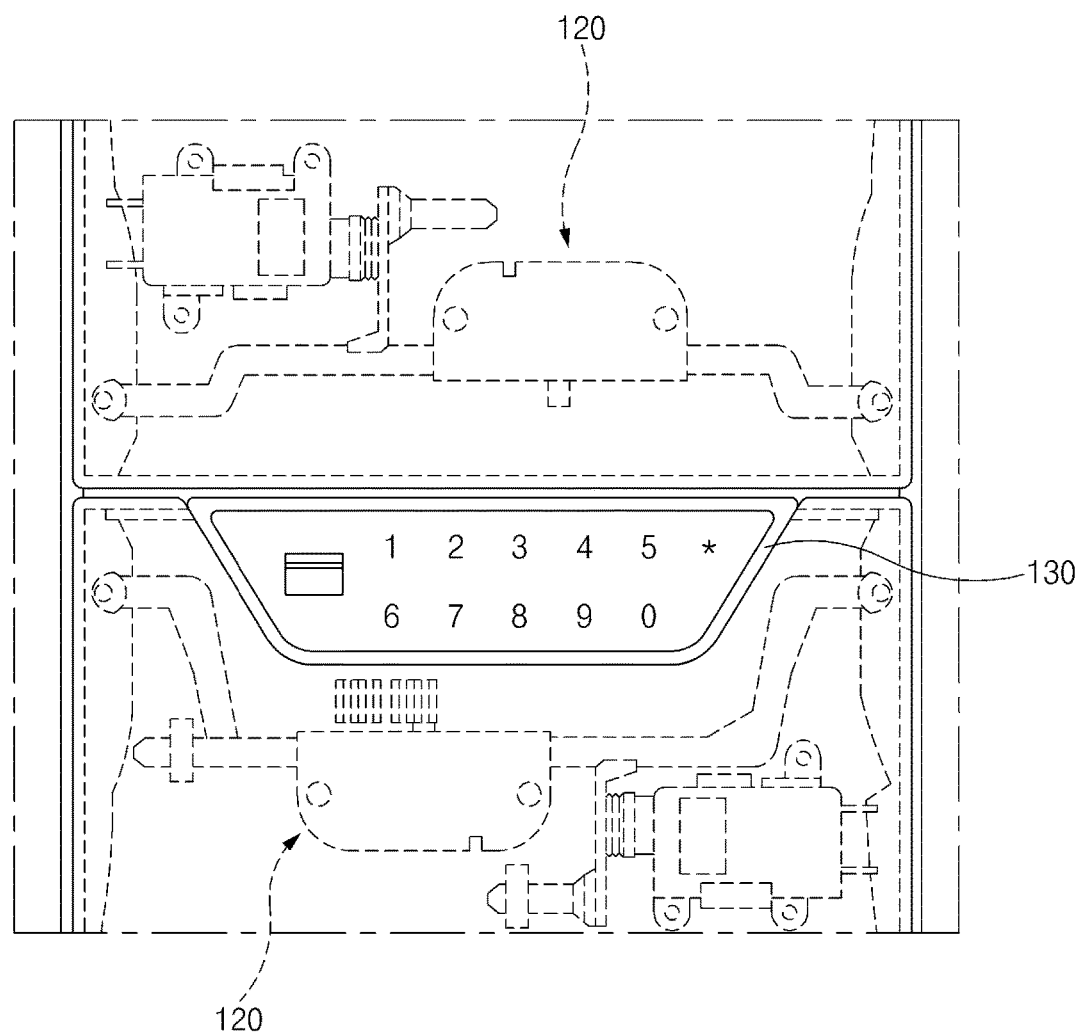
FIG. 4 is a view illustrating a locking module provided in an upper cover and a lower cover of the tray device for a vehicle according to various embodiments of the present invention.

As illustrated in FIGS. 2 and 4, an RF receiver 131 may be provided in the touch pad 130 and interwork with a card. When a card is touched, unlocking of the cover 110 may be approved through the RF receiver 131. The RF receiver 131 may have an infrared sensor 132, and the infrared sensor 132 is activated only when a user is in proximity thereto, minimizing a standby current.

As illustrated in FIG. 3, a password registration button B interworking with the touch pad 130 is provided in the locking module 120 to allow registration of a card and a password. Here, the registration button B does not operate until the cover 110 is opened, making it impossible for someone else other than the user to register a card and a password, and thus, security is enhanced.

As illustrated in FIGS. 1 and 4, in various embodiments of the present invention., the cover 110 includes an upper cover 111 and a lower cover 112, and the touch pad 130 may be provided in either the upper cover 111 or the lower cover 112. In the following descriptions and drawings, it is illustrated that the touch pad 130 is provided in the lower cover 112, but it is merely illustrative and installation of the touch pad 130 is not limited to the lower cover 112.

The locking module 120 may be provided in each of the upper cover 111 and the lower cover 112 to simultaneously open the upper cover 111 and the lower cover 112 when an unlocking operation is performed through an operation of the touch pad 130.

Figure 5:
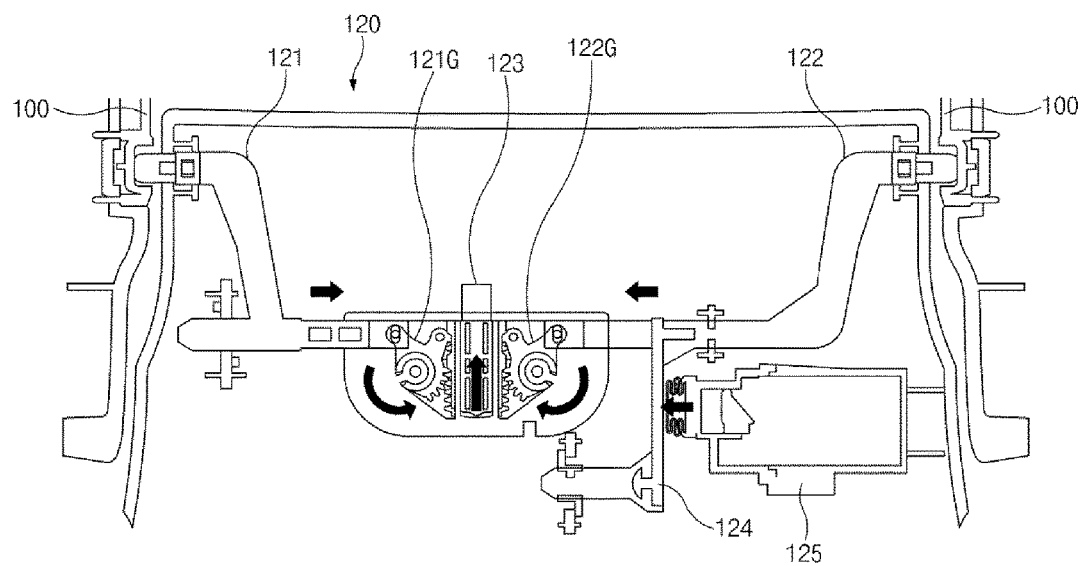
FIG. 5 is a cross-sectional view illustrating an operation of unlocking a cover by the locking module in the tray device for a vehicle according to various embodiments of the present invention.
Figure 6:
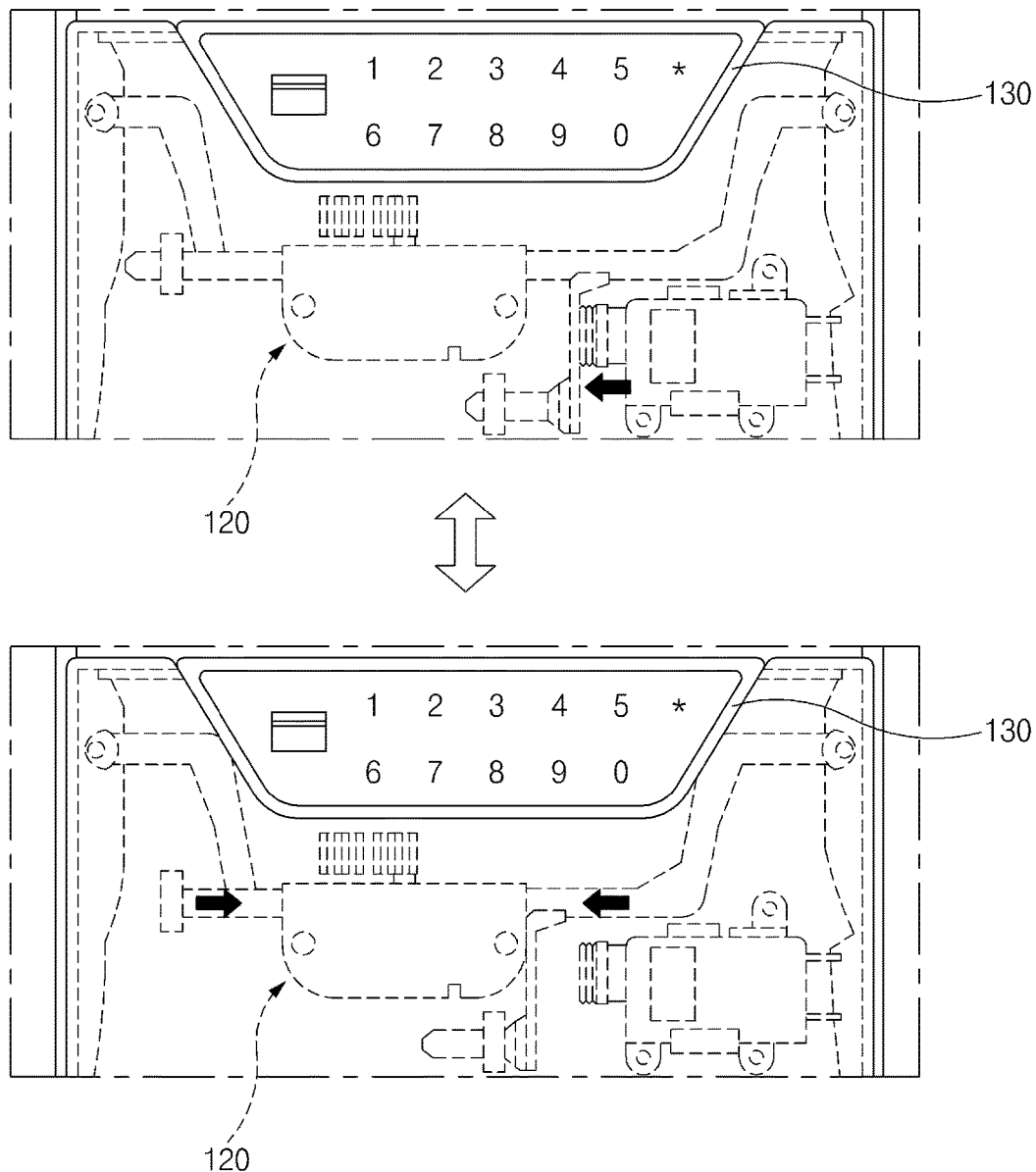
FIG. 6 is a view illustrating states before and after the cover is unlocked by the locking module in the tray device for a vehicle according to various embodiments of the present invention.

As illustrated in FIGS. 5 and 6, the locking module 120, which releases locking to open the cover 110 when a password is input to the touch pad 130, includes a first rod 121 and a second rod 122 provided on both ends thereof, a first gear 121G and a second gear 122G respectively connected to the first rod 121 and the second rod 122, a coupling bar 123 connecting the first gear 121G and the second gear 122G, a connection rod 124 moving the first rod 121 or the second rod 122, and an actuator 125 moving the connection rod 124.

The first rod 121 is positioned on the left side of the locking module 120 and movable in a horizontal direction, and one end of the first rod 121 is inserted into one end of an inner side of the tray 100 to maintain left locking of the cover 110.

The second rod 122 is positioned on the right side of the locking module 120 and movable in a horizontal direction, and one end of the second rod 122 is inserted into the other end of the inner side of the tray 100 to maintain right locking of the cover 110.

The first gear 121G is rotatably provided at the other end of the first rod 121.

The second gear 122G is rotatably provided at the other end of the second rod 122.

The coupling bar 123 may have a gear teeth formed on both ends thereof and may be coupled to the first gear 121G and the second gear 122G. As the first gear 121G and the second gear 122G rotate, the coupling bar 123 is moved in a vertical direction to move the first rod 121 and the second rod 122.

The connection rod 124 is positioned in the first rod 121 or the second rod 122 to move the first rod 121 or the second rod 122.

The actuator 125 is connected to the connection rod 124, and when an unlocking operation is performed, the actuator 125 interworks with the touch pad 130 to move the connection rod 124.

When a card or a password through the touch pad 130 is matched, the touch pad 130 transmits a corresponding signal to the actuator 125 of the locking unit 120. The actuator 125 then pushes the connection rod 124, the connection rod 124 pushes the second rod 122, one end of the second rod 122 is released from the other end of the inner side of the tray 100, and at this time, the second gear 122G provided at the other end of the second rod 122 rotates to move the coupling bar 123 upwards. Here, as the coupling bar 123 moves upwards, the first gear 121G also rotates and the first rod 121 moves rightwards accordingly, and thus, one end of the first rod 121 is released from one end of an inner side of the tray 100 and the cover 110 is opened from the tray 100.

The actuator 125 pushes the cover 110 up to a stroke required for opening of the cover 110, and after the cover 110 is opened, the actuator 125 is automatically returned to be ready for a next operation. Here, after the cover 110 is opened, the cover 110 may be closed forcibly by a user, and after the cover 110 is closed, the cover 110 may be opened by repeating the aforementioned process.

In various embodiments of the present invention, the touch pad 130 and the actuator 125 may operate cooperatively with a power source of a vehicle. However, in a case in which the power source has a problem or the touch pad 130 or the actuator 125 is broken down, since the cover 110 may not be opened through the touch pad 130, the cover 110 may be forcibly opened through the unlocking module 140.

Here, as illustrated in FIGS. 7 and 8, the unlocking module 140 includes a rotor 142 into which the key 141 is inserted and a locking rod 144 connected to the rotor 142 and moving the first rod 121 and the second rod 122 of the locking module 120.

The rotor 142 is provided such that the key 141 is inserted thereinto and rotates, and an arrest protrusion 143 protrudes from an end of the rotor 142.

Figure 9:
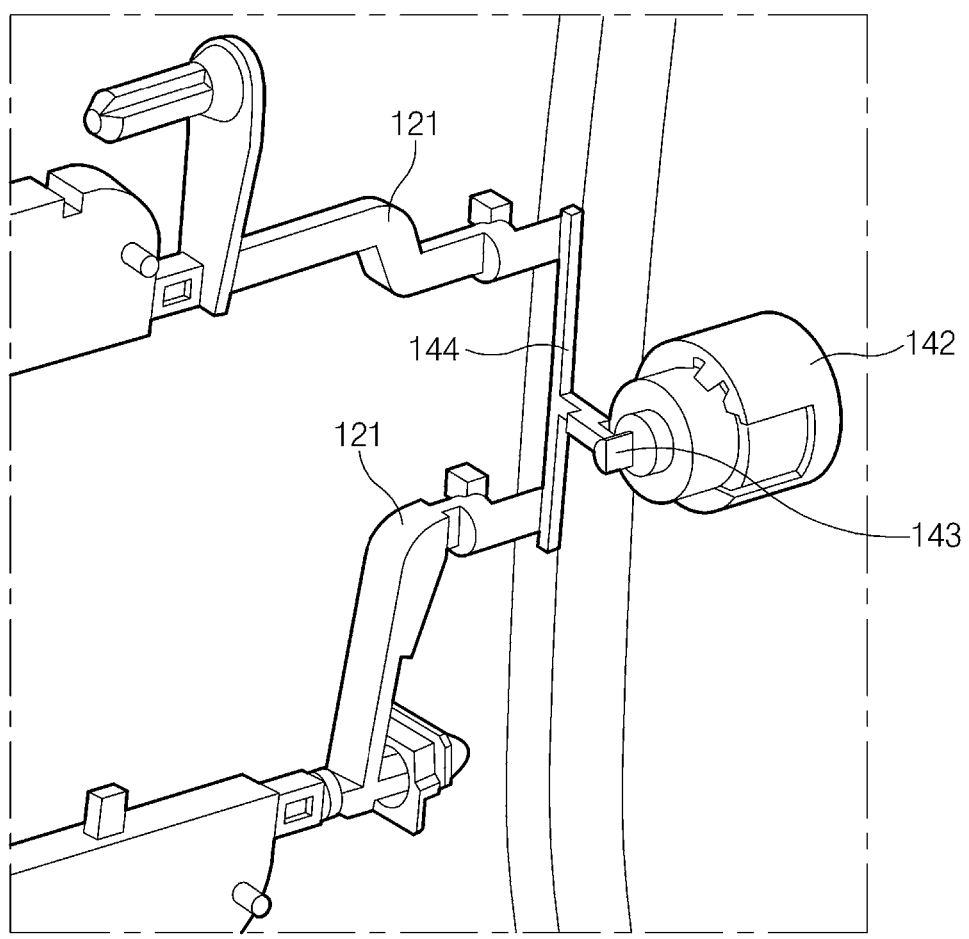
FIG. 9 is a view illustrating an unlocking operation by the unlocking module in the tray device for a vehicle according to various embodiments of the present invention.
Figure 10:
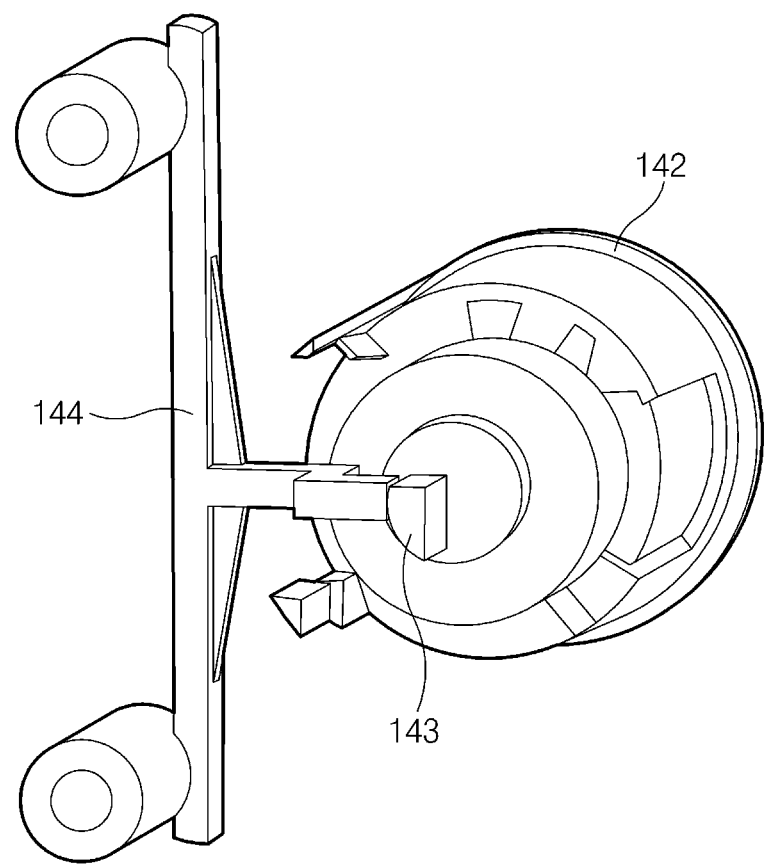
FIG. 10 is a view illustrating an operational state of a rotor and a locking rod of the unlocking module in the tray device for a vehicle according to various embodiments of the present invention.
Figure 11:
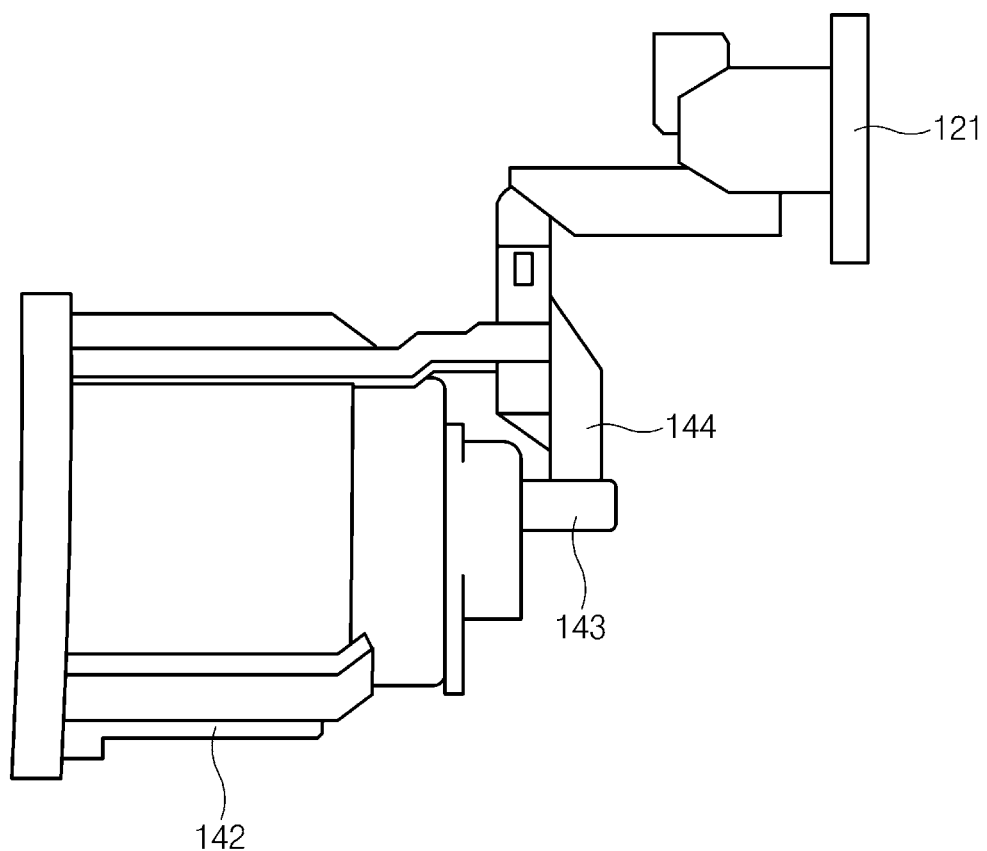
FIG. 11 is a view illustrating an operational state of the rotor and a locking rod of an unlocking module and a rod of the locking module in the tray device for a vehicle according to various embodiments of the present invention.

As illustrated in FIGS. 9 to 11, the locking rod 144 connects the rotor 142 and a rod of the locking module 120. One end of the locking rod 144 is positioned to be adjacent to the arrest protrusion 143 and the other end thereof is positioned at one end of the first rod 121 or the second rod 122 of the locking module 120, so that when the rotor 142 is rotated by operating the key 141, the locking rod 144 moves the first rod 121 or the second rod 122 provided in the upper cover 111 and the lower cover 112 toward an inner side of the tray 100.

That is, when the rotor 142 is rotated by operating the key 141, the arrest protrusion 143 of the rotor 142 pushes the locking rod 144 according to the rotation of the rotor 142, and as the locking rod 144 is pushed, one end of the first rod 121 or the second rod 122 of the locking module 120 positioned at the other end of the locking rod 144 is automatically pushed, and when one end of the first rod 121 or the second rod 122 is pushed, the other end thereof is also moved in terms of the characteristics of the locking module 120, thus opening the cover 110.

Without a signal or a current, the actuator 125 is in a returned state, and thus, in an emergency operation as mentioned above, the actuator 125 does not interfere with the rod operation, and thus, there is no problem in operating the unlocking module 140.

In this manner, the tray device for a vehicle according to various embodiments of the present invention includes the tray 100 provided in a vehicle and having the cover 110 capable of being opened, the locking module 120 provided in the cover 110 to lock or unlock the cover 110, the touch pad 130 provided on an outer side of the cover 110 and interworking with the locking module 120 to unlock the cover 110 through a touch operation, and the unlocking module 140 provided on an outer side of the tray 100 and interworking with the locking module 120 to forcibly open the cover 110. Since the touch pad 130 is installed in the tray 100 for a vehicle and the tray 100 may be locked or unlocked through the touch pad 130, user convenience may be enhanced and personal security may be satisfied, and when the touch pad 130 does not operate, the tray 100 may be forcibly opened using the key 141, increasing merchantability.

As described above, according to various embodiments of the present invention, the touch pad is installed in the tray for a vehicle and the tray may be locked or unlocked through the touch pad, whereby user convenience may be enhanced and personal security may be satisfied, and when the touch pad does not operate, the tray may be forcibly opened using the key, increasing merchantability.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tray device for a vehicle, the tray device comprising:
a tray provided in the vehicle and having a cover configured for being opened;
a locking module provided in the cover to lock or unlock the cover;
a touch pad provided on an outer side of the cover and interworking with the locking module to unlock the cover through a touch operation;
an unlocking module provided on an outer side of the tray and interworking with the locking module to forcibly open the cover through an operation of a key,
wherein the cover includes an upper cover and a lower cover, and the touch pad is provided in either the upper cover or the lower cover,
wherein the locking module is provided in each of the upper cover and the lower cover to simultaneously open the upper cover and the lower cover when unlocking the touch pad, and
wherein the locking module includes;
rods movably disposed in a horizontal direction and having first ends inserted into an inner side of the tray;
gears rotatably disposed at second ends of the rods;
a connection, rod positioned in at least one of the rods to move one of the rods; and
an actuator connected to the connection rod and interworking with the touch pad to move the connection rod during an unlocking operation.

2. The tray device according to claim 1, wherein the key interworks with a smart key or a card key for the vehicle.

3. The tray device according to claim 1, wherein the touch operation of the touch pad includes touching at least one of a card and a password.

4. The tray device according to claim 3, wherein the card interworks with a smart key or a card key for the vehicle.

5. The tray device according to claim 1, wherein the touch pad is provided in either the upper cover or the lower cover.

6. The tray device according to claim 3, wherein a radio frequency (RF) receiver interworking with the card is provided in the touch pad, and has an infrared sensor.

7. The tray device according to claim 6, wherein a password registration button interworking with the touch pad is provided in the locking module.

8. The tray device according to claim 5, wherein the locking module is provided in each of the upper cover and the lower cover to simultaneously open the upper cover and the lower cover when unlocking the touch pad.

9. The tray device according to claim 8,
wherein the rods include:
a first rod having the first end inserted into a first end of the inner side of the tray; and
a second rod having the first end inserted into a second end of the inner side of the tray;
wherein gears includes:
a first gear rotatably disposed at the second end of the first rod; and
a second gear rotatably disposed at the second end of the second rod, and
wherein the locking module further includes a coupling bar having gear teeth provided on both ends thereof and respectively coupled to the first gear and the second gear, and moved in a vertical direction according to rotations of the first gear and the second gear to move the first rod and the second rod.

10. The tray device according to claim 9, wherein the touch pad and the actuator are configured to interwork with a power source of the vehicle to be operated.

11. The tray device according to claim 9, wherein the unlocking module includes:
a rotor configured for a key to be inserted thereinto, being rotatable, and having an arrest protrusion protruding from an end thereof; and
a locking rod having a first end positioned to be adjacent to the arrest protrusion of the rotor and a second end positioned at at least one of ends of the first rod and the second rod of the locking module, and moving at least one of the first rod and the second rod toward the inner side of the tray when the rotor rotates.

* * * * *